Oct. 12, 1954    A. P. PCOLA    2,691,235
ANIMATED FISH LURE
Filed Aug. 20, 1953
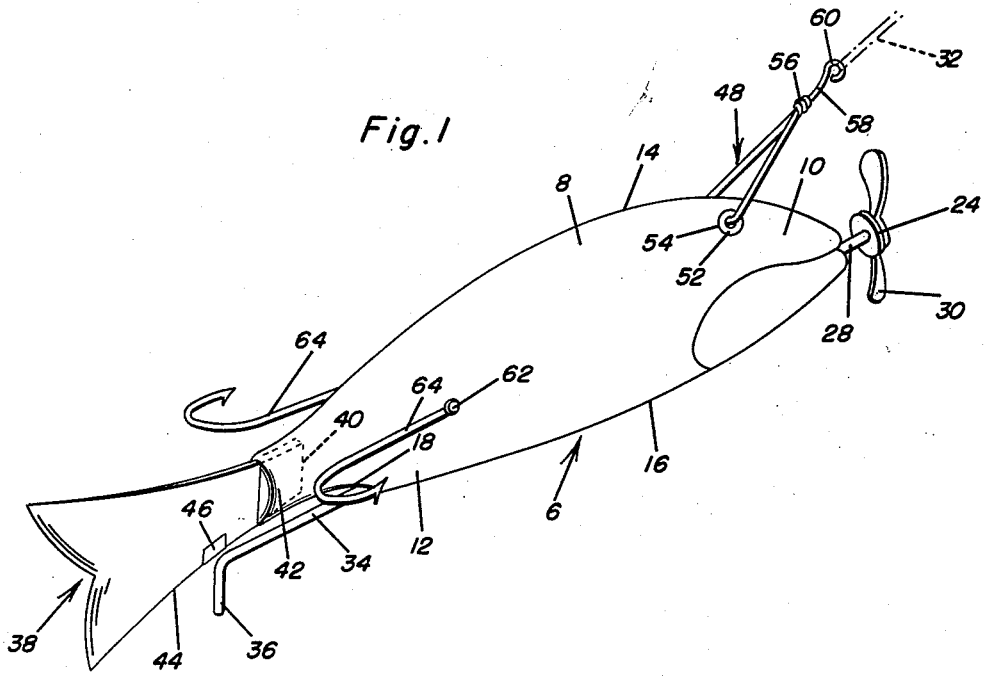
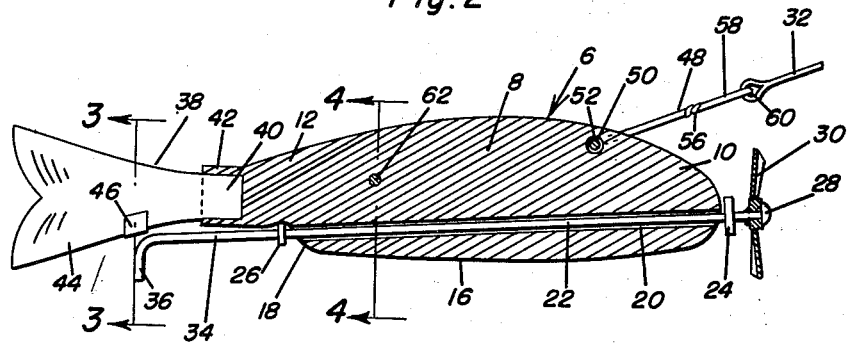
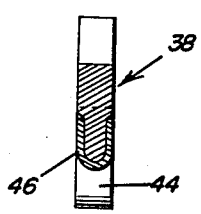
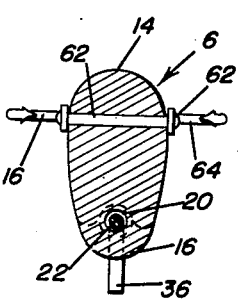
Andrew P. Pcola
INVENTOR.

Patented Oct. 12, 1954

2,691,235

UNITED STATES PATENT OFFICE 2,691,235

ANIMATED FISH LURE

Andrew P. Pcola, St. Michael, Pa.

Application August 20, 1953, Serial No. 375,413

5 Claims. (Cl. 43—26.2)

The present invention relates to certain new and useful improvements in artificial fishing bait and has reference in particular to an animated fish lure, that is, a lure which is specially constructed to be drawn by a fishing line through a body of water and which is provided at its trailing end with a tail which is movable relative to the body of the lure in such a manner that the lure appears to be alive and in the act of swimming through the water.

Briefly summarized, the invention has to do with an animated fishing lure which is characterized by an elongate body which may be either buoyant or non-buoyant, whichever is desired. The body is of elongate form and suitably shaped to resemble a creature, for example, a so-called minnow, said body therefore having leading and trailing ends, dorsal and ventral portions appropriately shaped to provide the appearance desired. There is a tail carried by the trailing end and this has a normal central position approximately in axial alignment with the longitudinal axis of the body, said tail being adapted to be flipped to one side and then returned to its given normal position. A propeller-equipped shaft mounted for rotation on the body is provided at its rear end with a trip finger or a so-called tappet-like portion, the terminal of the latter being in close proximity to a lower marginal edge of the tail and releasably and intermittently engageable with the tail, whereby the latter is successively flipped to provide the desired life-like fluttering movement to the overall lure.

The object of the invention is to structurally, functionally and otherwise improve upon similarly constructed and performing animated lures of the type having an actuatable tail and wherein one improvement resides in the tail, the latter being shaped to represent a fish tail and constructed of flexibly resilient material, the inherent resiliency of which constrains the tail to occupy a normal position in axial alignment with the longitudinal axis of the body and which makes it possible to forcibly deflect and flip the tail to one side, depending on the spring-back properties of the resilient material to cause the tail to resume its normal position during each cycle of operation.

A further object has to do with the stated flexibly resilient tail and the improved means for actuating it, said means being in the form of a propeller shaft rotatable in the ventral portion of the body and having its rear end extending beyond the trailing end of the body and provided with a laterally bent finger which functions as the aforementioned tappet-like portion, the terminal of the tappet-like portion engaging a predetermined intermediate portion of the lower marginal edge of the tail to releasably and intermittently engage the tail and to bring about the desired flipping and flopping of the tail and the resultant animated action of the over-all lure as it is drawn, by the line, through the water.

Other objects, features and advantages will become more readily apparent from the following description and the accompanying sheet of illustrated drawings.

In the accompanying sheet of drawings, wherein like numerals are employed to designate like parts throughout the views:

Figure 1 is a perspective view of an animated fishing lure constructed in accordance with the principles of the present invention;

Figure 2 is a view based on Figure 1 with the body and propeller in section and the other parts principally in elevation;

Figure 3 is an enlarged cross-section taken on the vertical line 3—3 of Figure 2 looking in the direction of the arrows; and, Figure 4 is a section on the vertical 4—4 line of Figure 2 looking in the direction of the arrows.

The aforementioned body, which may be of any suitable contour and shape and material is denoted, as an entity, by the numeral 6. The main or intermediate body portion is denoted at 8 and the leading end, sometimes called the head, is denoted by the numeral 10, the trailing tapered end portion is denoted by the numeral 12, while the dorsal or top is denoted at 14 and the ventral or belly side is denoted at 16. The latter side called the trailing end, is cut away as at 18 to provide clearance for the adjacent parts. The cut away provides a shoulder at the trailing end of a lengthwise bore or passage 20 which extends through the ventral portion of the body. This passage serves to accommodate a substantially horizontal shaft 22 which is mounted for free rotation in the passage and is provided with a stop collar 24 at the forward end and a similar stop collar 26 at the opposite end, which collars prevent excessive lengthwise slippage of the shaft and consequently serves to maintain the shaft in its desired rotatable position. The projecting forward end of the shaft 28 is provided with a fixed bladed propeller 30 which turns in the water as the lure is drawn through the water by a fishing line 32. The extending rear end portion of the shaft 34 is provided with a laterally bent trip finger 36 which constitutes an operating tappet-like portion for the flexibly resilient tail 38.

The tail is of the shape shown and has one end portion 40 suitably anchored in a socket 42 provided therefor in the body. The longitudinal marginal edge portion 44 of the tail is provided with a metal U-shaped clip 46 which is suitably fastened in place in line with what may be called the path of rotation of the tappet-like portion 36. As the bait or lure is drawn through the water by the fishing line in the well known manner, the propeller serves to rotate the shaft 22 which in turn rotates the tappet-like portion, bringing it into intermittent or periodical operating engagement with the wear clip 46. The position of the tail is normally central, that is in axial alignment with the longitudinal axis of the body, it may be flipped, however, to the left in the drawings in Figure 1. It will be assumed that for the most part the propeller will turn the shaft in one direction, flipping the tail to the left and then allowing the tail to swing back to its normal position. On the other hand, it is obvious that the direction of the rotation of the shaft may be either in one direction or the other, making it possible for the tappet to engage either side of the clip and to flex the tail accordingly.

The numeral 48 designates a substantially triangular yoke having a portion 50 which is loosely anchored in a transverse hole or opening 52 provided therefor in the upper dorsal portion of the leading end portion 10. If desired, the ends of the hole may be suitably decorated as at 54 to represent eyes. The ends of the wire yoke are wrapped together as at 56 to provide a shank 58 and a line eye 60. This arrangement serves to secure the line in a position above the path of rotation of the propeller.

A transverse rod 62 is fixed in the body at the trailing end, and the ends thereof extend outwardly of the body surface to permit the eyes of the parallel shank portions of the fishing hooks 64—64 to be joined therewith. These hooks are fixed and stay in the position shown.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An animated fishing lure comprising an elongate body shaped in resemblance of a predetermined creature and having leading and trailing ends, dorsal, and ventral portions, a tail carried by the trailing end and movable relative to said body, a lengthwise shaft mounted for rotation in said body and having its respective forward and rearward ends projecting beyond the corresponding leading and trailing ends of said body, a propeller fixed to the forward end of said shaft for rotating the shaft, and means on the trailing end of said shaft for moving, and thus activating said tail, said tail being flexibly resilient and normally having its longitudinal axis positioned substantially in alignment with the longitudinal axis of said body and adapted to be forcibly and intermittently flexed to a momentarily displaced position by said means on said shaft and resiliently returned to its normal axially aligned position.

2. The structure defined in claim 1, wherein said means comprises a tappet-like portion on said shaft which turns with the shaft and swings into releasable engagement with a marginal edge portion of said tail.

3. The structure defined in claim 1 wherein said means is in the form of a laterally offset trip finger portion, the latter functioning as a tappet which during its travel through an orbital path swings periodically into releasable tail-flipping engagement with a marginal edge portion of said tail.

4. The structure defined in claim 1 wherein said means is in the form of a laterally offset trip finger portion, the latter functioning as a tappet which during its travel through an orbital path swings periodically into releasable tail-flipping engagement with a marginal edge portion of said tail, that portion of the tail contacted by said tappet being provided with a wear-resisting member.

5. The structure defined in claim 1 wherein said means is in the form of a laterally offset trip finger portion, the latter functioning as a tappet which during its travel through an orbital path swings periodically into releasable tail-flipping engagement with a marginal edge portion of said tail, that portion of the tail contacted by said tappet being provided with a wear-resisting member, the latter comprising a U-shaped metal clip affixed to said tail in the path of rotation of said tappet.

References Cited in the file of this patent

UNITED STATES PATENTS

| Number | Name | Date |
|---|---|---|
| 777,491 | Brown | Dec. 13, 1904 |
| 1,627,512 | Hughes et al. | May 3, 1927 |